US012634248B2

(12) United States Patent
Bonyadi et al.

(10) Patent No.: US 12,634,248 B2
(45) Date of Patent: May 19, 2026

(54) PEOPLE-CENTRIC DIGITAL MEMORY SYSTEM FOR A DIGITAL ASSISTANT

(71) Applicant: Microsoft Technology Licensing, LLC, Redmond, WA (US)

(72) Inventors: Mohammadreza Bonyadi, Trondheim (NO); Aleksander Øhrn, Oslo (NO); Espen Trautmann Sommerfelt, Oslo (NO); Eivind Berg Fosse, Oslo (NO); Kateryna Solonko, Oslo (NO); Ola Sætrom, Oslo (NO); Malgorzata Paruch, Stavanger (NO); Håkon Bergland Brugård, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 291 days.

(21) Appl. No.: 18/435,756

(22) Filed: Feb. 7, 2024

(65) Prior Publication Data

US 2025/0254138 A1      Aug. 7, 2025

(51) Int. Cl.
G06F 15/16        (2006.01)
G06F 16/332       (2019.01)
H04L 51/02        (2022.01)

(52) U.S. Cl.
CPC .......... H04L 51/02 (2013.01); G06F 16/3326 (2019.01)

(58) Field of Classification Search
CPC .............................. H04L 51/02; G06F 16/3326
USPC ......................................................... 709/206
See application file for complete search history.

(56) References Cited

U.S. PATENT DOCUMENTS

| | | | |
|---|---|---|---|
| 9,373,322 B2 * | 6/2016 | Goussard ................ | G06F 40/20 |
| 2017/0039341 A1 | 2/2017 | Shklarski | |
| 2019/0050432 A1 | 2/2019 | Donneau-Golencer | |
| 2020/0394366 A1 | 12/2020 | Miller et al. | |
| 2020/0395001 A1 | 12/2020 | Mohanty | |
| 2021/0141820 A1 | 5/2021 | Vora | |
| 2023/0074406 A1 | 3/2023 | Baeuml | |
| 2023/0259540 A1 | 8/2023 | Das | |
| 2024/0296316 A1 * | 9/2024 | Singh ................... | G06N 3/0475 |
| 2025/0085986 A1 * | 3/2025 | Lien ........................ | G06F 9/451 |

(Continued)

OTHER PUBLICATIONS

Hyland. "Document Retention Periods and Guidelines". Archived version dated Oct. 21, 2023. pp. 1-29. (Year: 2023).*

(Continued)

*Primary Examiner* — Imad Hussain

(74) *Attorney, Agent, or Firm* — Novo TechIP International PLLC

(57) ABSTRACT

A digital assistant system includes a digital memory configured to collecting data pertaining to a user from a plurality of user information sources, to extract relevant pieces of information from the collected data, and to generate new user data elements using an information extraction component, the new user data elements including the extracted relevant pieces of information. The new user data elements are tagged with content classification tags which indicate a type of content of the extracted pieces of information in the new user data elements and retention period tags which indicate retention periods for the new user data elements. Information from the user data elements is retrieved in response to receiving a prompt from a digital assistant artificial intelligence (AI) component. The retrieved information is provided to the digital assistant AI as user context information.

20 Claims, 8 Drawing Sheets

(56) References Cited

U.S. PATENT DOCUMENTS

| | | | | |
|---|---|---|---|---|
| 2025/0117386 A1* | 4/2025 | Agarwal | ........... | G06F 16/24542 |
| 2025/0131024 A1* | 4/2025 | Gupta | .................... | H04L 67/535 |
| 2025/0131121 A1* | 4/2025 | Teng | ........................ | G10L 15/30 |
| 2025/0181617 A1* | 6/2025 | Bruton | .................. | G06F 16/353 |
| 2025/0210033 A1* | 6/2025 | Sharifi | ............. | G06F 16/33295 |
| 2025/0225430 A1* | 7/2025 | Cheng | ..................... | G06F 9/451 |
| 2025/0278415 A1* | 9/2025 | Mui | .................... | G06F 16/9024 |

OTHER PUBLICATIONS

Bonyadi, Reza., "On the Cognitive Capacity of Large Language Models", Retrieved from https://www.linkedin.com/pulse/cognitive-capacity-large-language-models-reza-bonyadi/, Apr. 22, 2023, 13 Pages.
Daley, et al., "How Gist Memory Helps US Plan for the Future", Retrieved from https://www.psychologytoday.com/nz/blog/achievements-the-aging-mind/202108/how-gist-memory-helps-us-plan-the-future, Aug. 26, 2021, 11 Pages.
Gates, Bill., "AI is about to completely change how you use computers", Retrieved from https://www.gatesnotes.com/AI-agents, Nov. 9, 2023, 15 pages.
Welsh, Matt., "Large Language Models and The End of Programming", Retrieved from https://www.youtube.com/watch?v=JhCl-GeT4jw, Oct. 30, 2023, 01 page.
International Search Report and Written Opinion received for PCT Application No. PCT/US2025/012257, Apr. 9, 2025, 13 pages.

* cited by examiner

300

User Query/Request

302

Digital Assistant Response

304

Accept    Try again    Delete 308    310    312

600

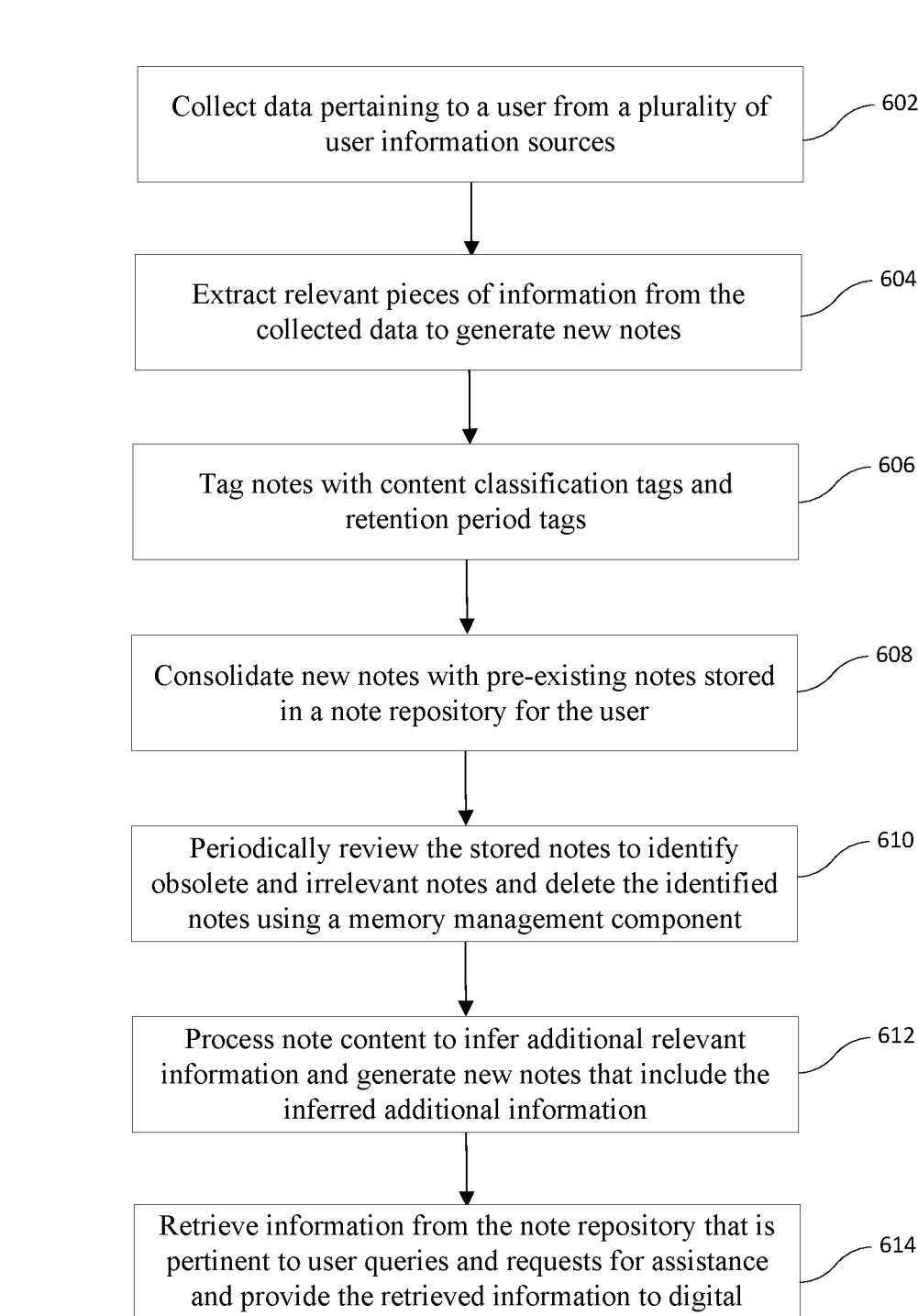

Collect data pertaining to a user from a plurality of user information sources — 602

Extract relevant pieces of information from the collected data to generate new notes — 604

Tag notes with content classification tags and retention period tags — 606

Consolidate new notes with pre-existing notes stored in a note repository for the user — 608

Periodically review the stored notes to identify obsolete and irrelevant notes and delete the identified notes using a memory management component — 610

Process note content to infer additional relevant information and generate new notes that include the inferred additional information — 612

Retrieve information from the note repository that is pertinent to user queries and requests for assistance and provide the retrieved information to digital assistant AI as user context — 614

FIG. 6

PEOPLE-CENTRIC DIGITAL MEMORY SYSTEM FOR A DIGITAL ASSISTANT

BACKGROUND

A digital assistant is a software program or application that uses artificial intelligence (AI) and/or natural language processing (NLP) to understand and respond to user queries or commands. Digital assistants are designed to perform tasks, answer questions, and provide information to users in a conversational manner. Digital assistants can be integrated into various applications or be used as standalone components to help users with tasks like answering questions, summarizing content, setting reminders, sending messages, and searching the internet, among other functions. The goal in offering digital assistants is often to provide users with a more convenient and intuitive way to interact with technology.

While AI-based digital assistant tools are effective in helping a user with general tasks, such as writing documents, gathering data, and organizing information, these tools have limitations due to their short-term memory and the general, not contextual, knowledge they have been built with. In addition, AI-based tools, and AI models in general, are more prone to hallucinations (i.e., unanticipated results) without grounded context.

Hence, there is a need for AI-based digital assistant tools that are capable of contextualizing the AI model response.

SUMMARY

In one general aspect, the instant disclosure describes a digital assistant system having a processor and a memory in communication with the processor, where the memory comprises executable instructions that, when executed by the processor alone or in combination with other elements, cause the digital assistant system to perform multiple functions. These functions include collecting data pertaining to a user from a plurality of user information sources; extracting relevant pieces of information from the collected data to generate new user data elements using an information extraction component, the new user data elements including the extracted relevant pieces of information; tagging the new user data elements with one or more tags using a tagging component, the one or more tags including content classification tags which indicate a type of content of the extracted pieces of information in the new user data elements and retention period tags which indicate retention periods for the new user data elements, the retention periods being based in part on the content of the extracted pieces of information in the new user data elements; storing the new user data elements in a user data repository; retrieving information from user data elements stored in the user data repository using an information retrieval component in response to receiving a prompt from a digital assistant artificial intelligence (AI) component, the prompt being generated based on user input defining a query or request for assistance from the digital assistant system; and providing the retrieved information as user context information to the digital assistant AI component, the digital assistant AI component being trained to process the user input and the user context information to generate a response to the query or request for assistance.

In another general aspect the instant disclosure describes a method of operating a digital assistant system. The method includes collecting data pertaining to a user from a plurality of user information sources; extracting relevant pieces of information from the collected data to generate new user data elements using an information extraction component, the new user data elements including the extracted relevant pieces of information; tagging the new user data elements with one or more tags using a tagging component, the tags including content classification tags which indicate a type of content of the extracted pieces of user information in the new user data elements and retention period tags which indicate retention periods for the new user data elements, the retention periods being based in part on the content of the extracted pieces of information in the new user data elements; consolidating the tagged new user data elements with pre-existing user data elements stored in a user data repository for the user using a memory consolidation component; retrieving information from the user data elements in the user data repository, using an information retrieval component, based on user input received via a user interface component defining at least one of a query or a request for assistance from the digital assistant system; and providing the retrieved information as user context information to a digital assistant artificial intelligence (AI) component, the digital assistant AI component being trained to process the user input and the user context information to generate a response to the query or request for assistance.

In yet another general aspect, the instant disclosure describes a non-transitory computer readable medium on which are stored instructions that when executed cause a programmable device to perform functions of collecting data pertaining to a user from a plurality of user information sources; extracting relevant pieces of information from the collected data to generate new user data elements using an information extraction component, the new user data elements including the extracted relevant pieces of information; tagging the new user data elements with one or more tags using a tagging component, the tags including content classification tags which indicate a type of content of the extracted pieces user information in the new user data elements and retention period tags which indicate retention periods for the new user data elements, the retention periods being based in part on the content of the extracted pieces of information in the new user data elements; consolidating the tagged new user data elements with pre-existing user data elements stored in a user data repository for the user using a memory consolidation component; periodically reviewing the user data elements stored in the user data repository to identify at least one of obsolete and irrelevant user data elements based at least in part on the retention period tags of the user data elements and deleting any user data elements identified obsolete or irrelevant; processing content of the user data elements in the user data repository to infer additional information pertaining to one or more facts pertaining to one or more of the user, a user contact, and an action performed by the user or a user contact, and generating at least one new tagged note that includes the additional information; retrieving information from the user data elements in the user data repository based on user input received via a user interface component defining a query or request for assistance from a digital assistant system using an information retrieval component; and providing the retrieved information as user context information to a digital assistant artificial intelligence (AI) component, the digital assistant AI component being trained to process the user input and the user context information to generate a response to the query or request for assistance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 6 is a flow diagram showing an example method for operating a digital assistant system that includes a digital memory.

DETAILED DESCRIPTION

Figure 1:
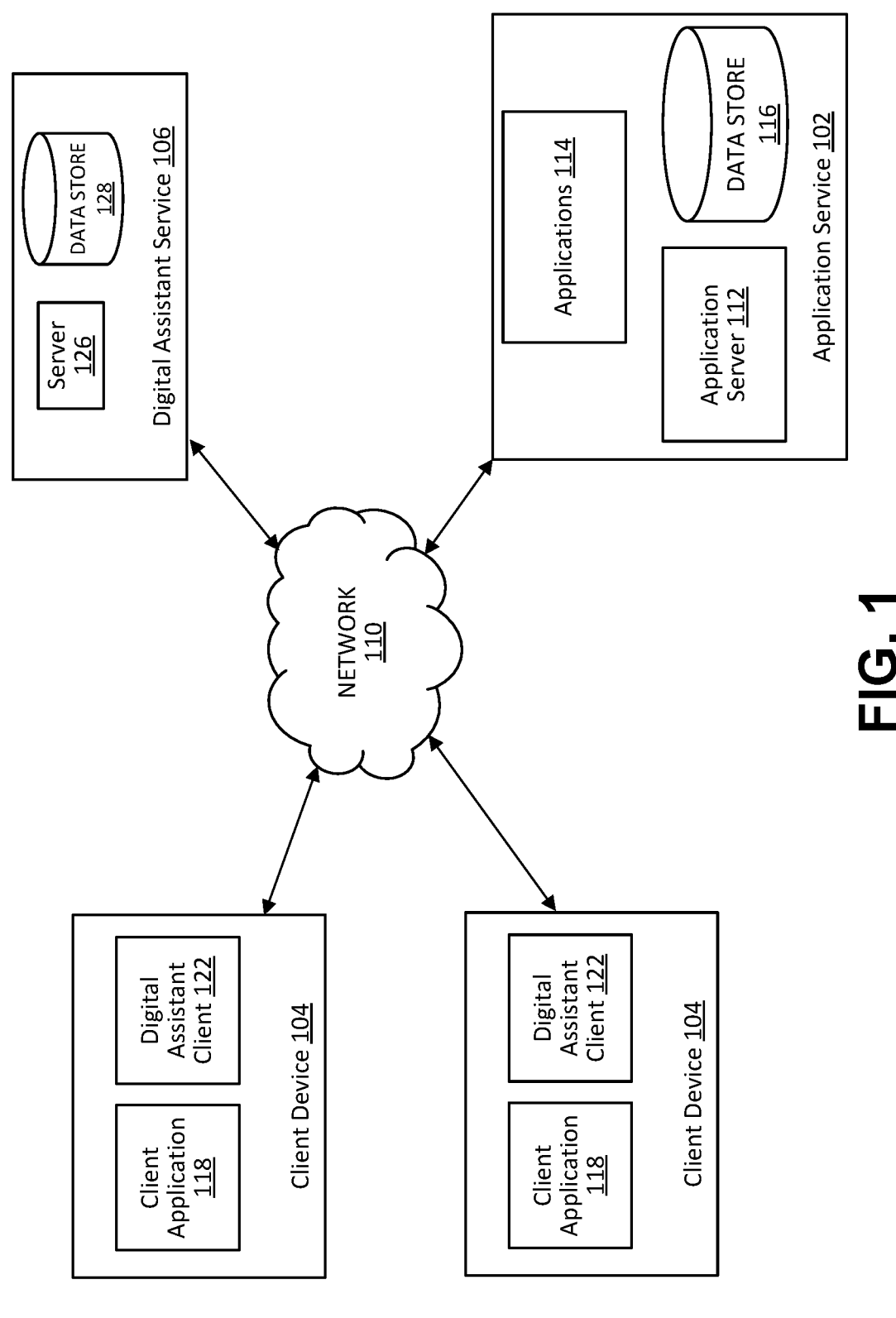
FIG. 1 depicts an example computing environment upon which aspects of this disclosure may be implemented.

Currently, artificial intelligence (AI) based digital assistant tools are helping millions of users in performing numerous tasks, such as writing better documents, researching topics, organizing information, planning tasks, and managing projects. These tools often utilize a generative AI model, such as Large Language Models (LLM), to process user input, in the form of prompts, and to generate natural language responses based on the input. However, generative AI is limited in its ability to remember or consider contextual information pertaining to users requesting assistance or the prompts for which assistance is created when providing assistance to users. As a result, the output generated by digital assistant tools is not always relevant or personalized to the user requesting assistance.

One method that has been proposed to add user context to AI-based digital assistant tools is to add enterprise data to user prompts as an input to an LLM that is used in the digital assistant. This can be accomplished in different manners such as training the LLM on the enterprise-specific data to internalize organizational knowledge, or dynamically injecting the data into the LLM's operational context. However, training an LLM on enterprise data is both costly and complex. It not only demands substantial computational resources but also requires frequent updates to maintain knowledge freshness. Furthermore, implementing robust privacy measures in this setup can be exceedingly challenging and would likely require that one LLM be fine-tuned for each user.

Injecting enterprise data into the LLM context is also constrained by the limited context size (32K tokens for GPT-4, for example). To work around this limitation, a specialized search mechanism may be used to identify relevant data from the enterprise database given the user query, ensuring the retrieved data is both relevant to the query and fits into the LLM context. This data, along with the user's initial query/request for assistance, is then processed by the LLM to generate a response. In this method, the quality of the digital assistant's responses is directly tied to the efficacy of the search algorithm. In essence, the search function becomes the bottleneck for the quality of the responses generated by the LLM. Thus, there exists a technical problem of lack of efficient mechanisms for ensuring user context is considered by AI-based digital assistant tools.

To address these technical problems and more, in an example, this description provides technical solutions in the form of an AI-based digital memory system for digital assistants that collects user data, such as user enterprise data, extracts relevant information pertaining to the user from the collected data, and tags and saves the extracted information as user data elements in a user information repository for the user. As used herein, the phrase "user data element" refers to an electronic file, document, data structure, or the like that is capable of storing data, text, images, audio, video, and other forms of media and/or information pertaining to a user as well as metadata, or tags, which describe the data. Each user data element is used to store one or more items of information pertaining to a user, such as contact information, events, tasks, projects, hobbies, interests, and substantially any other type information which may be relevant to a user. In various implementations, the user data that is collected is people-centric, meaning that the information pertains to the user and the people with which the user interacts, such as contacts, friends, family, co-workers, associates, etc. (referred to herein collectively as "contacts" or "user contacts"). As examples, the user data that is collected can include personal information, relationship information, event information, action/interaction information, any other information which may be relevant to the user and/or to the user contacts.

The information is extracted from data that the user has access to. Collected data for the user data elements can include user interactions with applications, documents generated or collaborated on by a user, user information posted to social media, communication information sent and received by a user (e.g., emails, messages, etc.), previous interactions with the digital assistant, responses to inquiries received from the digital assistant, data collected from other sources (e.g., third party sources) and the like. This information is processed, tagged, and stored in a manner that enables user context information to be quickly identified and retrieved. The tagging process is used to organize the user context into user data elements and to set the life cycle of user data elements within the system. Thus, the technical solution enables a digital assistant to maintain a digital memory of users who use the digital assistant system. The digital memory may be unstructured data that can import existing data and can be gathered by the digital assistant asking additional questions of users and the data can be built up over time. An aspect includes the digital assistant making calls to tools to gather information about the user based on an initial request and taking the digital user memory into account as context in providing answers to the users.

The system is also configured to collect user context information from other sources when the information needed for a digital assistant AI to respond to a user query/request for assistance is not included in the user data repository. When the system determines additional information is needed to respond to a user query/request, the system can attempt to retrieve additional information from the user, e.g., by querying or prompting the user for additional information via a user interface of the digital assistant. The system may also be configured to retrieve additional information from other sources which are external to the digital assistant system, such as third-party applications/websites, social media, and other applications and services. In various implementations, the system is configured to use the application programming interfaces (APIs) of one or more external sources of user information to generate appropriate API calls to retrieve desired information.

Once the user context information for a given query/request has been retrieved, the system is configured to generate a prompt for the digital assistant AI that includes the original user input and the retrieved user context information. The prompt is generated with the formatting and structure required by the digital assistant AI to facilitate processing by digital assistant AI. This provides technical advantages by automatically enabling context information to be integrated into a prompt along with the user query/request that the context information pertains to. This enables the output of the digital assistant AI to include more relevant information and/or to take into consideration information that would otherwise not be available to the digital assistant AI.

To facilitate the identification and retrieval of relevant user information (as well as to avoid misinterpretation of stored information), the information is extracted and stored with a reference back to the original source. As an example, information indicating that a contact was sick yesterday (i.e., relevant note information) is stored together with reference information indicating that it was mentioned in a particular message or email.

In various implementations, user data elements are stored in an unstructured manner as four-tuples: <p, f, r, e>, where p is the person the extracted information is related to (e.g., owner of a document commented on, sender of an email, etc.), f is the information extracted, r is the reference to the context which can be text or an identifier, referring back to the origin of the information, and e is a key, such as an embedding, hash-key, etc., which can be used to search across user data elements. Metadata is used to add system information to user data elements, such as note type/classification, retention period, and the like. The digital memory system also includes mechanisms for consolidating user data elements, identifying and removing obsolete and irrelevant user data elements, and distilling further relevant information from the content of saved user data elements.

The system includes an intelligent information retrieval component which utilizes AI to identify relevant user data elements to retrieve based on a user's current context. The current context can include a current user query (e.g., prompt) which is provided as input to the digital assistant as well as current user input provided to an application, such as email, messaging, social media, and the like. The intelligent retrieval component is trained to process the user input to identify tags which are relevant to the user input and retrieve user data elements having the identified tags. The intelligent retrieval component may also be trained to determine whether user data elements having the appropriate tag(s) are relevant to the current user input. This can be based on the retention period tag of the user data elements (e.g., older user data elements may not be relevant to a user input requesting the most current information) and/or other note tags indicating that the information does not pertain to the current user input.

In various implementations, the digital memory system is integrated into a digital assistant system which receives and/or monitors the user input and provides the user input to the digital memory system where it is processed by the information retrieval component to retrieve relevant information from the user data elements in the user information repository. The relevant information is then returned to the digital assistant system as user context information which is included with the user input as a prompt to the digital assistant AI. The digital assistant system is configured to generate the prompt (including the user input and the context information retrieved from the user repository) in a manner that is suitable for the digital assistant AI to process. In other words, the user input and retrieved context data is provided in a suitable format with the appropriate structure for processing by the digital assistant AI.

Data can be collected over time as the user interacts with applications, communicates, and stores data. In some implementations, the digital memory system can collect data as needed in response to user input. For example, in response to receiving a user request for assistance, the digital memory system can make calls to data collection tools, such as an enterprise data collection service, to gather information pertaining to the user and to process the gathered information to generate user context information which is provided to the digital assistant. For example, in some implementations, in response to receiving a user request for assistance, the digital memory system is configured to generate one or more queries and/or prompts for additional information which are presented to the user via a user interface.

FIG. 1 shows an example computing environment 100 in which aspects of the disclosure may be implemented. The computing environment 100 includes an application service 102, client devices 104, and a digital assistant service 106 which communicate with each other via a network 110. The network 110 includes one or more wired, wireless, and/or a combination of wired and wireless networks. In some implementations, the network 110 includes one or more local area networks (LAN), wide area networks (WAN) (e.g., the Internet), public networks, private networks, virtual networks, mesh networks, peer-to-peer networks, and/or other interconnected data paths across which multiple devices may communicate. In some examples, the network 110 is coupled to or includes portions of a telecommunications network for sending data in a variety of different communication protocols. In some implementations, the network 110 includes Bluetooth® communication networks or a cellular communications network for sending and receiving data including via short messaging service (SMS), multimedia messaging service (MMS), hypertext transfer protocol (HTTP), direct data connection, WAP, email, and the like.

The application service 102 may be implemented as a cloud-based service or set of services. To this end, application service 102 is executed on or includes at least one application server 112 which is configured to provide computational and/or storage resources for implementing the application service 102. The application server 112 is representative of any physical or virtual computing system, device, or collection thereof, such as, a web server, rack server, blade server, virtual machine server, or tower server, as well as any other type of computing system used to implement the application service 102. In some implementations, the application server 112 is implemented in a data center, a virtual data center, or some other suitable facility. Application server 112 executes one or more software applications, modules, components, or collection thereof capable of providing the application service 102 to clients, such as client devices 104. In some implementations, the application service 40 provides one more web-based applications 114 which provide functionality for users to consume, create, share, collaborate on, and/or modify various types of electronic content, such as but not limited to textual content, imagery, presentation content, web-based content, forms and/or other structured electronic content, and other types of electronic content.

In some implementations, the application server 112 hosts data and/or content in connection with the application service 102 and makes this data and/or content available to the users of client devices 104 via the network 110. Program code, instructions, user data and/or content for the application service 102 is stored in a data store 116. Although a single server 112 and data store 116 are shown in FIG. 1, application service 102 may utilize any suitable number of servers and/or data stores.

Client devices 104 enable users to access services and/or applications offered by the application service 102. The client devices 104 may include any suitable type of computing device, such as personal computers, desktop computers, laptop computers, mobile telephones, smart phones, tablets, phablets, smart watches, wearable computers, gaming devices/computers, televisions, and the like. Each client device 104 includes at least one client application 118 that is executed on the client device 104 for interacting with the application service 102. In some implementations, the client application 118 is a local content editing application, such as a word processor, spreadsheet application, presentation authoring application, email client, and/or the like, that is capable of communicating and interact with the application service 102. In other implementations, the client application 118 is a web browser that enables access to web-based application(s) implemented by the application service 102.

The digital assistant service 106 is configured to perform tasks or services, for a user of a client device 104 based on user input as well as features such as location awareness and the ability to access information from a variety of sources including online sources (such as weather or traffic conditions, news, stock prices, user schedules, retail prices, etc.). Examples of tasks that may be performed by the digital assistant service 106 on behalf of the user may include, but are not limited to, placing a phone call, launching an application, sending an e-mail or text message, playing music, scheduling a meeting or other event on a user calendar, obtaining directions to a location, obtaining a score associated with a sporting event, posting content to a social media web site, recording reminders or notes, obtaining a weather report, obtaining the current time, setting an alarm, finding a nearby commercial establishment, performing an Internet search, or the like. The digital assistant service 106 includes at least one server 126 which provides computational and/or storage resources for implementing the digital assistant service 106. Program code, instructions, user data and/or content for the digital assistant service 106 is stored in a data store 128. Although a single server 126 and data store 128 are shown for the digital assistant service 106 in FIG. 1, digital assistant service 106 may utilize any suitable number of servers and/or data stores.

The client devices 104 include a digital assistant client 122 for accessing functionality provided by the digital assistant service 106. The digital assistant client 122 may be a software application, module, component, or collection thereof which is capable of interacting with the digital assistant service 106. In one implementation, the digital assistant client 122 is implemented as an integrated feature or component of a software application, such client application 118. In other implementations, the digital assistant client 122 is implemented as a standalone software application programmed to communicate and interact with the digital assistant service 106.

Figure 2:
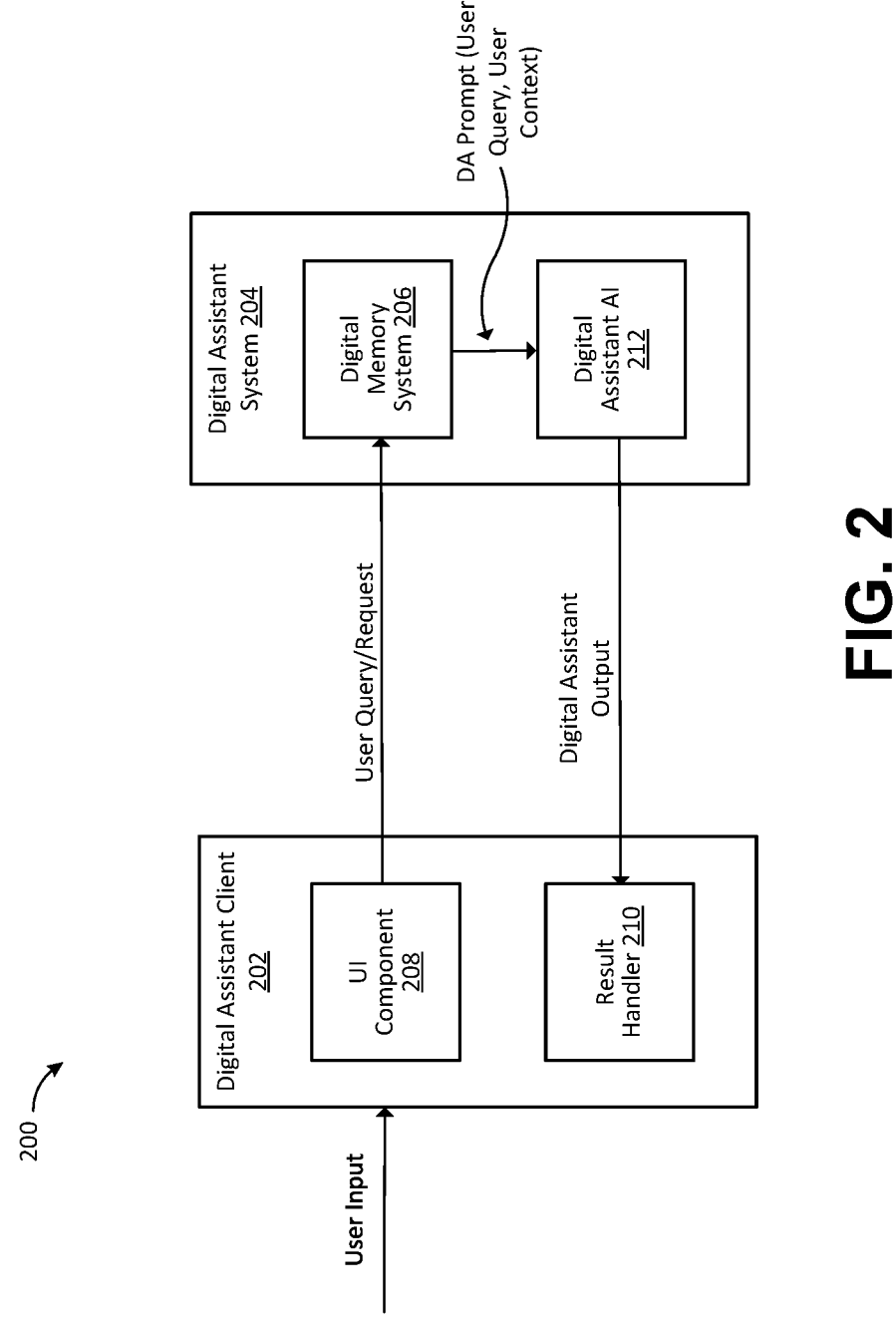
FIG. 2 depicts an example implementation of a digital assistant service which may be implemented in the environment of FIG. 1.

FIG. 2 depicts an example implementation of a digital assistant service which may be implemented in the environment of FIG. 1. Digital assistant service 200 of FIG. 2 includes a digital assistant client 202 and a digital assistant system 204 that includes a digital memory system 206 and a digital assistant AI 212. As noted above, a digital assistant client 202 is executed on a client device and is used to enable users to access the digital assistant service. Digital assistant client 202 includes a UI component 208 and a result handler 210. UI component 208 receives user input defining a user query or request for assistance to the digital assistant service. The result handler 210 receives the output of the digital assistant service that is generated in response to the user query or request and causes the output to be displayed in a user interface of the digital assistant client 202.

Figure 3:
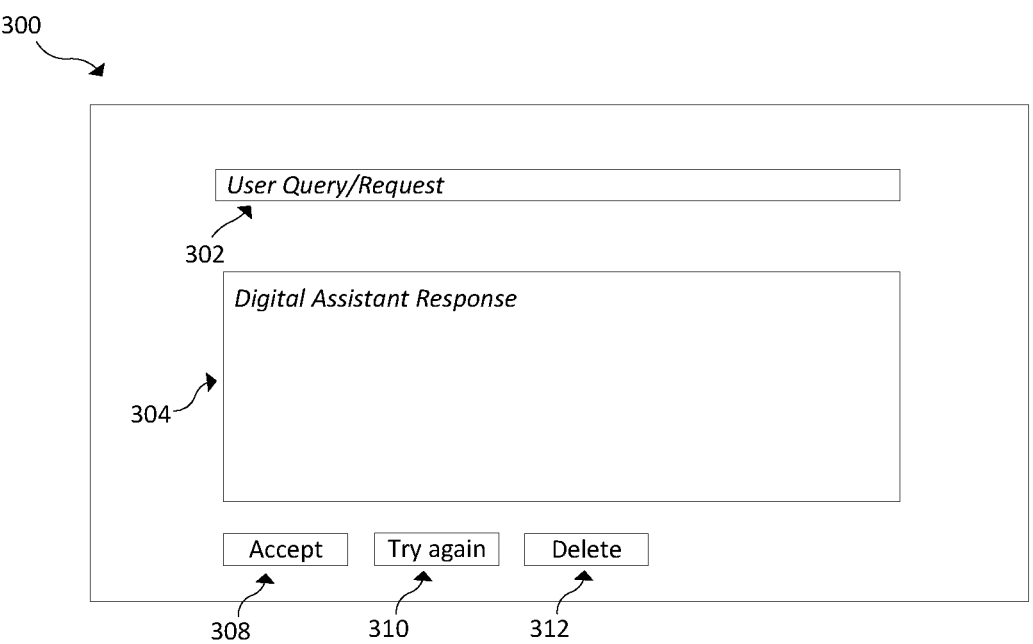
FIG. 3 depicts an example implementation of a user interface component of a digital assistance client of the digital assistant service of FIG. 2.

An example implementation of a UI component 300 of a digital assistant client is shown in FIG. 3. In various implementations, the UI component 300 includes a text input field 302 for receiving user input in the form of text which defines a user query or request for assistance. User input may be provided via a user input device, such as a keyboard, touch input, voice input, and the like. As a user provides user input, the digital assistant client sends the input to the digital assistant system. UI component 300 also includes a display region 304 for displaying digital assistant responses and other information returned by the digital assistant system. The UI component 300 may also include other UI controls, such as UI controls 308, 310, 312 which enable a user to accept a digital assistant response, request that the digital assistant try again to generate a response, and delete a response, respectively. In some implementations, in addition to text, other types of input may be provided as input to the digital assistant. For example, some implementations may enable the user to provide a voice input, and the like.

Referring back to FIG. 2, the digital assistant system 204 includes a digital assistant AI 212 for processing user queries and requests for assistance received from the digital assistant client 202 and generating natural language responses based on the user queries and requests. Digital assistant AI 212 is trained to answer questions, summarize content, set reminders, send messages, and search the internet, among other functions. Any suitable type of digital assistant AI may be utilized. In various implementations, the digital assistant AI 212 comprises a large language model (LLM). Examples of LLMs include, but are not limited to, generative models, such as Generative Pre-trained Transformer (GPT)-based models, e.g., GPT-3, GPT-4, ChatGPT, and the like.

Figure 4:
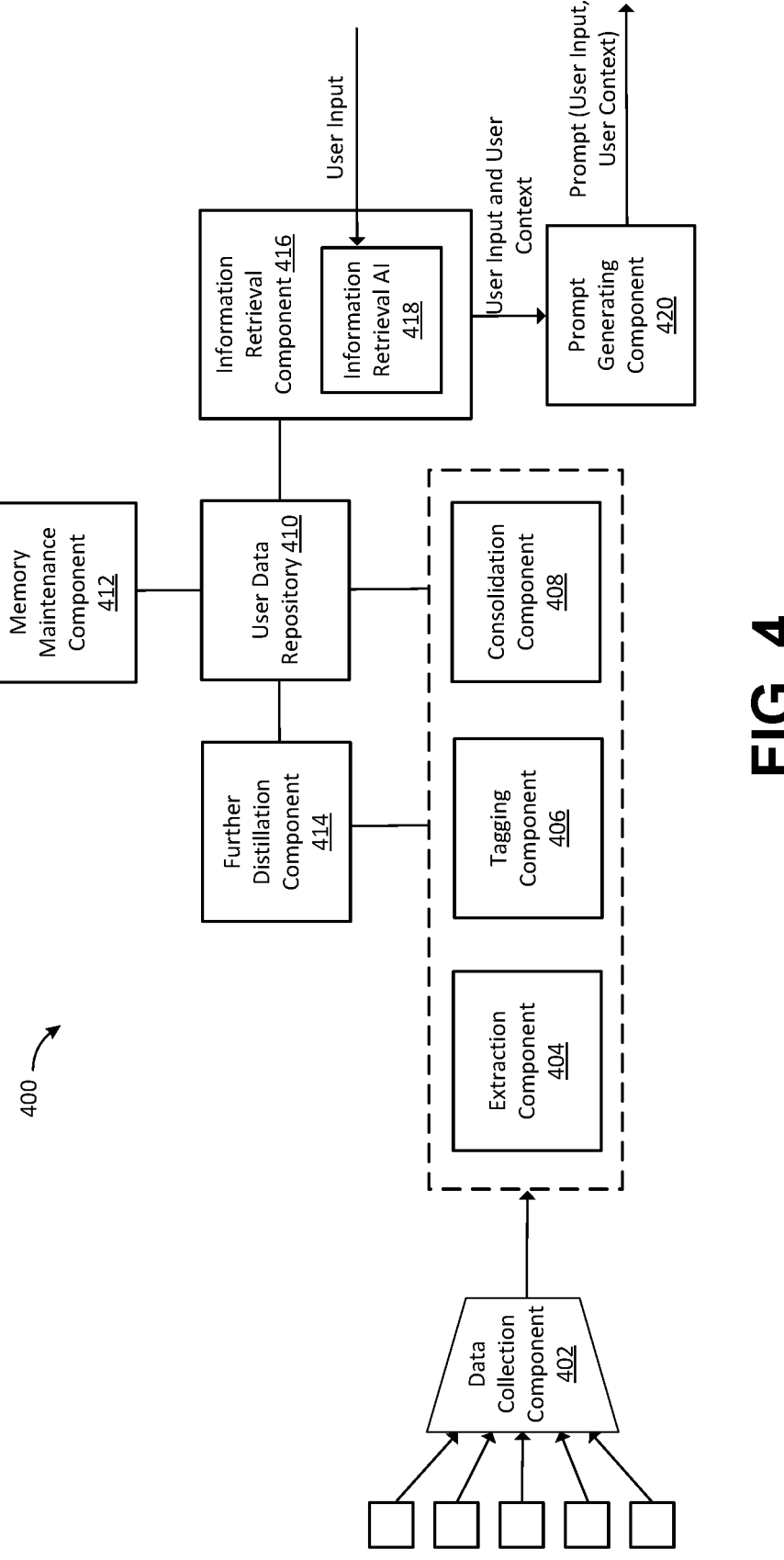
FIG. 4 depicts an example implementation of a digital memory system for a digital assistant service, such as the digital assistant service of FIG. 2.

To enhance the functionality of the digital assistant AI 212, a digital memory system 206 is provided that enables relevant user context information to be collected, stored, and easily retrieved. The digital memory system 206 receives the user query/request and is configured to retrieve user context data pertaining to the user query/request. The digital memory system then generates a prompt for the digital assistant AI 212 that includes the user query/request and the relevant user context data pertaining to the user query/request. The prompt is generated in a manner (e.g., formatted, structured, etc.) that is suitable for processing by the digital assistant AI. FIG. 4 depicts an example implementation of a digital memory system for a digital assistant service, such as the digital memory 206 of FIG. 2. The digital memory system 400 includes a data collection component 402, an extraction component 404, a tagging component 406, a consolidation component 408, a user data repository 410, a memory maintenance component 412, a further distillation component 414, an information retrieval component 416, and a prompt generating component 420. The data collection component 402 collects user information from user various sources, such as user interactions with one or more applications (e.g., web-based and/or client applications), documents generated or collaborated on by a user, user information posted to social media, communication information sent and received by a user (e.g., emails, messages, etc.), and the like. Only information that is accessible to a user is collected.

The data collection component 402 may be able to collect user information in any suitable manner. In various implementations, the data collection component 402 is programmed to interact with the software applications via Application Programming Interfaces (APIs) of the applications to define the functions, commands, variables, and the like for causing the applications to generate and send relevant user information. The data collection component 402 may also include an API which defines the functions, commands, variables, and the like for designating parameters for data collection, such as applications and/or locations from which to collect information, types of information to collect, and the like. In various implementations, the data collection component comprises an enterprise data collection service which is utilized to collect user information across an enterprise or organization.

The collected user information is provided to the information extraction component 404. In various implementations, the collected information is streamed to the information extraction component 404, and the information extraction component 404 processes the information as it is received. In other implementations, the collected information is stored in a temporary or intermediate data store, and the information extraction component 404 periodically accesses the data store to process the information and generate user data elements. The information extraction component 404 is configured to process the collected information to identify items or pieces of relevant information pertaining to a user.

The information extraction component 404 is also configured to format extracted information into a user data element format. In various implementations, user data elements are stored in an unstructured manner as tuples: <p, f, r, e> where p is the person the extracted information is related to (e.g., owner of a document commented on, sender of an email, etc.), f is the information extracted, r is the reference to the context which can be text or an identifier, referring back to the origin of the information, and e is a key, such as an embedding, hash-key, etc., which can be used to search across user data elements.

The tagging component 406 adds one or more tags to user data elements, such as content classification tags, date created/collected tags, retention period tags, and the like. Tags are labels or identifiers associated with information which are used by the system to categorize, describe, and organize the information for the system. In various implementations, tags are based on one or more predefined types, e.g., contact, calendar, task, event, etc. Tags may be generated as needed based on collected user information and can include information such as contact names, specific dates pertaining to events and/or tasks, etc., and any other label or designation which can be used by the system to categorize and organize information. Tags may be stored with the user data elements, e.g., as metadata, or stored in a separate data structure in association with the user data elements to which they are assigned. Once user data elements have been extracted and tagged, the user data elements are stored in the user data repository 410. The user data repository 410 may include any suitable type of memory, data store, storage device, or the like that enables storage and retrieval of user data elements.

The memory consolidation component 408 is configured to process tagged user data elements by consolidating new user data elements with pre-existing user data elements. For example, the memory consolidation component 408 analyzes new user data elements to see if the new user data elements include information pertaining to user data elements that have already been added to the repository 410, such as contact information, event information, task information, and the like. If a new user data element pertains to a previously stored user data element, the memory consolidation component 408 can add the information from the new user data element to the existing user data element. In various implementations, the memory consolidation component 412 processes the tags and/or content of new user data elements to determine if any new user data elements should be consolidated with an existing user data element. In some implementations, the memory consolidation component 408 is configured to determine whether information from a new user data element is new or old data pertaining to an existing user data element, e.g., such as recent/updated contact information vs. old contact information. If information in a new user data element is older than information which has been already added to an existing user data element, the new user data element can be discarded.

The information extraction component 404 and/or the memory consolidation component 408 may also be configured to process user data elements to verify the authenticity of information contained in the user data elements. For example, if new information indicates a fact which contradicts information which has already been established and added to the system, the new information can be ignored and/or discarded. For example, for new information indicating an incorrect date for an event or incorrect contact information for a pre-existing contact, the information can be ignored and/or discarded. Similarly, new information indicating that previous information is incorrect (e.g., retracted statement, deleted chat) can be used as the basis for modifying a pre-existing user data element, e.g., by removing the incorrect information. Alternatively, the digital memory system may be configured to identify new information that conflicts with existing information and present the new information to a user via the user interface and ask for confirmation or verification as to the veracity or authenticity of the new information. Based on the user response, the new information can be discarded or used to update existing information in the system.

The information extraction component 40, tagging component 406, and/or consolidation component 408 may also be configured to determine retention periods for user data elements which define how long user data elements should be kept in the repository before deletion. Retention periods for user data elements can be defined based on various factors, such as note type, information in the user data element, and the like. Some information by nature has a short lifespan, such as unique events, one-time tasks, and the like. Such user data elements can be assigned a retention period tag that is commensurate with the duration of the information. For example, a user data element indicating that a contact of a user has an illness will only be relevant for a limited duration (depending on the type of illness) and can be tagged with a retention period that is commensurate with the illness. Tagging therefore is not only used to organize information but also to set the foundation for its lifecycle within the system.

The digital memory system 400 also includes a memory maintenance component 412 for performing an ongoing review of user data elements to determine when user data elements become obsolete and should be purged from the system. In some implementations, the memory maintenance component 412 is configured to periodically review the retention period tags of user data elements to identify expired user data elements. The memory maintenance component may also process user data element content to determine whether the retention period for a given user data element should be updated. For example, if user data element information indicates that information is no longer applicable or is applicable longer than expected, the retention period can be updated, e.g., by shortening the period or extending the period, as needed.

The further distillation component 414 processes content of user data elements stored in the repository 410 to distil new information pertaining to contacts, events, tasks, and the like for a user. For example, the further distillation component 414 may be configured to process contact information to infer language(s) spoken by the contact, and analyze phone numbers of contacts to identify the country, state, region, etc. where contacts are from. As another example, emails and messages to and from contacts can be processed to infer additional information about the contacts and/or the relationship between the user and the contacts. For instance, if there are many emails/messages between the user and a contact having a friendly tone, it can be inferred that the user and the contact are close friends. In various embodiments, the system may be configured to notify the user of inferences and/or prompt the user for confirmation of inferences as they are made. Inferred information can be provided to the tagging component 406 for tagging and then to the consolidation component 408 for consolidation with related user data elements. In an example, this new information can be added to user data elements as "unconfirmed" or "possible" new information and can be presented to the user in this manner via the user interface.

The intelligent information retrieval component 416 utilizes the information retrieval AI 418 to identify relevant information to retrieve from user data elements in the user data repository based on a user's query or request for assistance. In an example, the digital assistant component provides the user query/response to the information retrieval component 416. The information retrieval AI 418 receives the user query/response as input and processes the user query/prompt to identify the people, event(s), task(s), and the like which are pertinent to the user query/request and accesses user data elements related to the identified people, event(s), task(s), and the like to identify relevant information which can be used by the digital assistant component to respond to the user query/response. The intelligent information retrieval component 416 provides the user input (e.g., query/request) and the retrieved user context data to the prompt generating component 420. The prompt generating component 420 is configured to generate a prompt for the digital assistant AI that includes the user input and the user context data and that is formatted and structured in a manner suitable for processing by the digital assistant AI.

Figure 5:
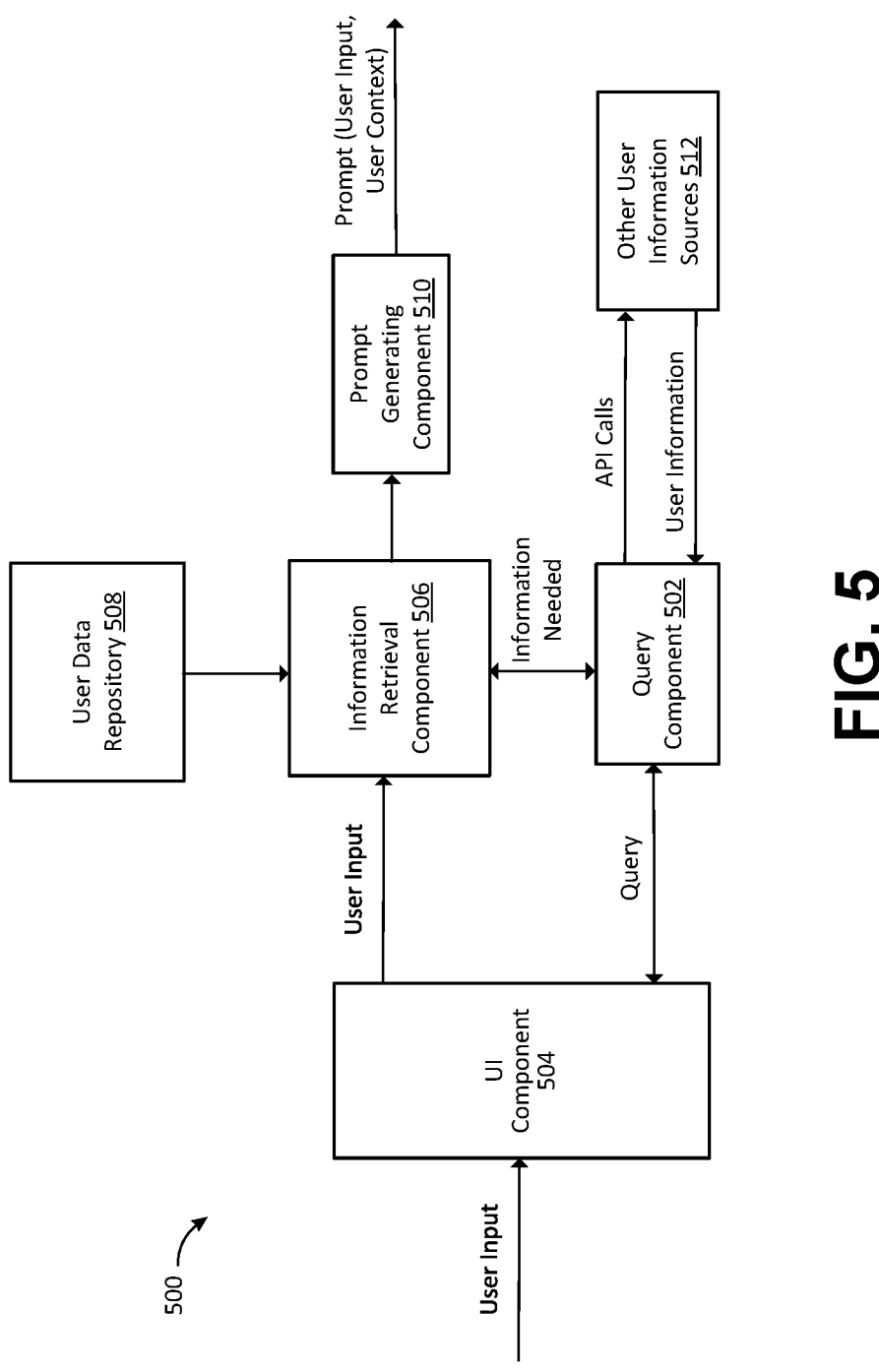
FIG. 5 depicts an implementation of an information retrieval component for a digital memory system.

In some implementations, the intelligent information retrieval component 416 is trained to determine whether additional information that is not currently available to the digital memory system is needed to respond to the user query/request. In this case, the intelligent information retrieval component 416 is configured to call on other tools for requesting the information from the user. For example, referring to FIG. 5, a digital memory system may include a query component 502 which is configured to generate queries and/or prompts for information which are presented to the user via the user interface component 504. When information retrieval component 506 determines additional information which is not available in the user data repository 508 is needed to respond to a user query/request, the information retrieval component 506 causes the query component 502 to query the user for the additional information. The query component 502 may also be configured to retrieve user context information from other sources 512, such as other applications, social media, third party applications and services, and the like. In various implementations, the query component 502 is configured to utilize one or more API(s) for the other information sources 512 to generate the appropriate calls to the sources to retrieve desired information.

User information provided in response to a query can be included in the user context that is provided to the prompt generating component 510. The information can also be processed into user data elements, tagged and stored in the user data repository for later use by the system.

FIG. 6 is a flow diagram showing an example method for operating a digital assistant system that includes a digital memory. In an example, one or more steps of method 600 are performed by a digital assistant service such as the digital assistant service 106 of FIG. 1 and/or by an application service such as the application service 102 of FIG. 1. The method 600 begins by collecting data pertaining to a user from a plurality of user information sources, 602. Relevant pieces of information are extracted from the collected data to generate new user data elements including the extracted relevant pieces of information using an information extraction component, at 604. The new user data elements are tagged with one or more tags using a tagging component, at 606. The tags include content classification tags which indicate a type of content of the extracted pieces user information in the new user data elements and retention period tags which indicate retention periods for the new user data elements. Retention periods for user data elements are based in part on the content of the extracted pieces of information in the new user data elements. The tagged new user data elements are then consolidated with pre-existing user data elements stored in a user data repository for the user using a memory consolidation component, at 608.

The user data elements stored in the user data repository are periodically reviewed to identify obsolete and irrelevant user data elements using a memory management component which deletes from the user data repository any identified obsolete or irrelevant user data elements, at 610. The content of the user data elements in the user data repository is periodically processed to infer additional relevant information pertaining to the user, a user contact, or an action performed by the user or a user contact and generate new tagged user data elements that include the inferred additional information, at 612. In response to receiving user input via defining a query or request for assistance from a user, an information retrieval component retrieves information relevant to the query or request for assistance from the user data elements stored in the user data repository and returns the retrieved information to a digital assistant AI component as context information, at 614.

Figure 7:
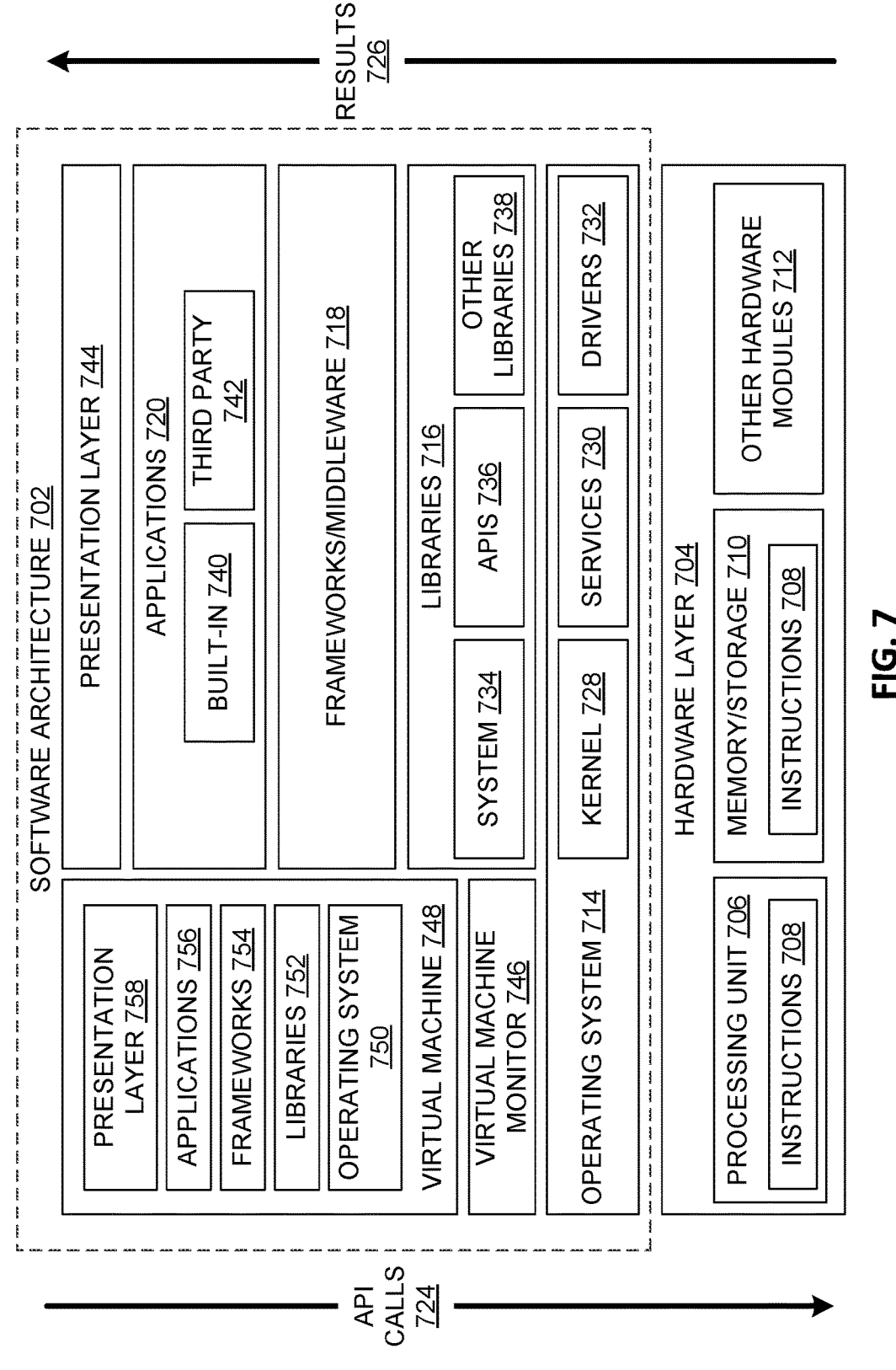
FIG. 7 is a block diagram of an example computing device, which may be used to provide implementations of the mechanisms described herein.

FIG. 7 is a block diagram 700 illustrating an example software architecture 702. This architecture may be used in each of the various services described above. Also, various portions of this architecture may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and Input/Output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
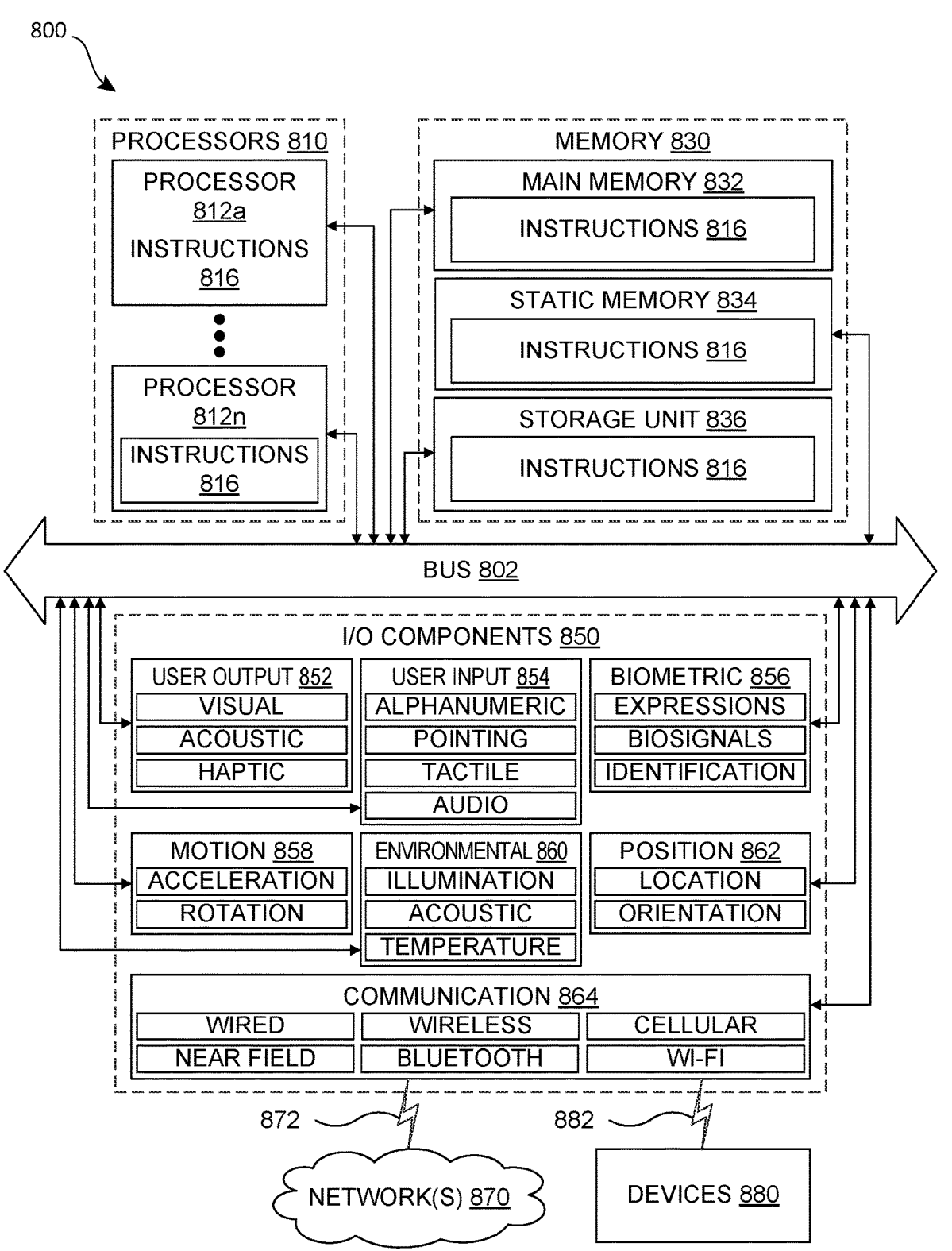
FIG. 8 is a block diagram illustrating components of an example machine configured to read instructions from a machine-readable medium.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. The machine 800 may be used to implement any of the services described in the system above.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A digital assistant system comprising:

a processor; and a memory in communication with the processor, the memory comprising executable instructions that, when executed by the processor alone or in combination with other processors, cause the digital assistant system to perform functions of:

collecting data pertaining to a user from a plurality of user information sources;

extracting relevant pieces of information from the collected data to generate new user data elements using an information extraction component, the new user data elements including the extracted relevant pieces of information;

tagging the new user data elements with one or more tags using a tagging component, the one or more tags including content classification tags which indicate a type of content of the extracted pieces of information in the new user data elements and retention period tags which indicate retention periods for the new user data elements, the retention periods being based in part on the content of the extracted pieces of information in the new user data elements;

storing the new user data elements in a user data repository;

retrieving user context information from user data elements stored in the user data repository using an information retrieval component in response to receiving a user query for assistance, the retrieved user context information being related to the user query;

generating a prompt for a digital assistant artificial intelligence (AI) component using a prompt generating component, the prompt including the user query and the retrieved user context information to provide a contextually relevant prompt and the prompt being formatted and structured in a manner suitable for processing by the digital assistant AI component; and providing the prompt to the digital assistant AI component.

2. The digital assistant system of claim 1, wherein the instructions, when executed by the processor alone or in combination with other processors, cause the digital assistant system to further perform functions of:

consolidating the tagged new user data elements with pre-existing user data elements stored in the user data repository for the user via a memory consolidation component;

periodically reviewing the user data elements stored in the user data repository to identify at least one of obsolete or irrelevant user data elements based at least in part on the retention period tags of the user data elements;

deleting any user data elements identified as obsolete or irrelevant;

processing content of the user data elements in the user data repository to infer additional information pertaining to one or more facts pertaining to at least one of the user, a user contact, and an action performed by the user or the user contact; and generating at least one new tagged user data element that includes the additional information.

3. The digital assistant system of claim 1, wherein the information retrieval component includes a generative AI model trained to:

process the user query to identify information needed by the digital assistant AI component to generate the response, retrieve the information needed by the digital assistant AI component from the user data repository, and provide the retrieved relevant information to the prompt generating component for inclusion in the prompt.

4. The digital assistant system of claim 3, wherein:

the information retrieval component determines whether the information needed by the digital assistant AI component is included in the user data repository, and when the information needed by the digital assistant AI component is not included in the user data repository, the information retrieval component is configured to retrieve additional user information from the user by causing at least one query to be generated and presented to the user via a user interface component that requests the additional information needed by the digital assistant AI component.

5. The digital assistant system of claim 4, wherein the information retrieval component is configured to retrieve the additional information from one or more other information sources by generating application programming interface (API) calls to the one or more other information sources.

6. The digital assistant system of claim 1, wherein each user data element is stored in the user data repository as a four-tuple that includes person data, note data, reference data, and key data, the person data identifying a person the extracted piece of information for the note is related to, the note data including the extracted piece of information for the note, the reference data identifying a source of the extracted piece of information, and the key data indicating a key for the note which enables searching across user data elements.

7. The digital assistant system of claim 6, wherein the user data elements are stored in an unstructured manner in the user data repository.

8. The digital assistant system of claim 6, wherein the tags assigned to user data elements are stored as metadata in association with the user data elements.

9. A method of operating a digital assistant system, the method comprising:

collecting data pertaining to a user from a plurality of user information sources;

extracting relevant pieces of information from the collected data to generate new user data elements using an information extraction component, the new user data elements including the extracted relevant pieces of information;

tagging the new user data elements with one or more tags using a tagging component, the tags including content classification tags which indicate a type of content of the extracted pieces of user information in the new user data elements and retention period tags which indicate retention periods for the new user data elements, the retention periods being based in part on the content of the extracted pieces of information in the new user data elements;

consolidating the tagged new user data elements with pre-existing user data elements stored in a user data repository for the user using a memory consolidation component;

in response to receiving a user query for assistance, determining whether information needed by a digital assistant artificial intelligence (AI) component is included in the user data repository, when the information needed by the digital assistant AI component is included in the user data repository, retrieving the information needed by the digital assistant AI component from the user data elements in the user data repository using an information retrieval component;

when the information needed by the digital assistant AI component is not included in the user data repository, retrieving the information needed by the digital assistant AI component from one or more external information sources by generating application programming interface (API) calls to one or more other information sources;

generating a prompt for the digital assistant AI component using a prompt generating component, the prompt including the user query and the retrieved information and being formatted and structured in a manner suitable for processing by a digital assistant artificial intelligence (AI) component; and providing the prompt to the digital assistant AI component.

10. The method of claim 9, further comprising:

periodically reviewing the user data elements stored in the user data repository to identify at least one of obsolete and irrelevant user data elements based at least in part on the retention period tags of the user data elements and deleting any user data elements identified obsolete or irrelevant; and processing content of the user data elements in the user data repository to infer additional information pertaining to one or more facts pertaining to one or more of the user, a user contact, and an action performed by the user or a user contact, and generating at least one new tagged note that includes the additional information.

11. The method of claim 9, wherein the information retrieval component includes a generative AI model trained to process the user query to identify the information needed by the digital assistant AI component to generate the response.

12. The method of claim 9, wherein each user data element is stored in the user data repository as a four-tuple that includes person data, note data, reference data, and key data, the person data identifies a person the extracted piece of information for the user data element is related to, the note data including the extracted piece of information for the user data element, the reference data identifying a source of the extracted piece of information, and the key data indicating a key for the user data element which enables searching across user data elements.

13. The method of claim 12, wherein the user data elements are stored in an unstructured manner in the user data repository.

14. The method of claim 9, wherein the tags assigned to user data elements are stored as metadata in association with the user data elements.

15. A non-transitory computer readable medium on which are stored instructions that, when executed, cause a programmable device to perform functions of:

collecting data pertaining to a user from a plurality of user information sources;

extracting relevant pieces of information from the collected data to generate new user data elements using an information extraction component, the new user data elements including the extracted relevant pieces of information;

tagging the new user data elements with one or more tags using a tagging component, the tags including content classification tags which indicate a type of content of the extracted pieces user information in the new user data elements and retention period tags which indicate retention periods for the new user data elements, the retention periods being based in part on the content of the extracted pieces of information in the new user data elements;

in response to receiving a user query for assistance, determining whether information needed by a digital assistant artificial intelligence (AI) component is included in a user data repository, when the information needed by the digital assistant AI component is included in the user data repository, retrieving the information needed by the digital assistant AI component from the user data elements in the user data repository using an information retrieval component;

when the information needed by the digital assistant AI component is not included in the user data repository, retrieving the information needed by the digital assistant AI component from one or more external information sources by generating application programming interface (API) calls to the one or more other information sources;

generating a prompt for the digital assistant AI component using a prompt generating component, the prompt including the user query and the retrieved information and being formatted and structured in a manner suitable for processing by a digital assistant artificial intelligence (AI) component; and providing the prompt to the digital assistant AI component.

16. The non-transitory computer readable medium of claim 15, wherein the functions further include:

consolidating the tagged new user data elements with pre-existing user data elements stored in a user data repository for the user using a memory consolidation component.

17. The non-transitory computer readable medium of claim 15, wherein the functions further include:

periodically reviewing the user data elements stored in the user data repository to identify at least one of obsolete and irrelevant user data elements based at least in part on the retention period tags of the user data elements and deleting any user data elements identified obsolete or irrelevant.

18. The non-transitory computer readable medium of claim 15, wherein the functions further include:

processing content of the user data elements in the user data repository to infer additional information pertaining to one or more facts pertaining to one or more of the user, a user contact, and an action performed by the user or a user contact, and generating at least one new tagged user data element that includes the additional information.

19. The non-transitory computer readable medium of claim 15, wherein the information retrieval component includes a generative AI model trained to process the user query to identify the information needed by the digital assistant AI component to generate the response.

20. The non-transitory computer readable medium of claim 15, wherein the tags assigned to user data elements are stored as metadata in association with the user data elements.

* * * * *